United States Patent
Chen et al.

(10) Patent No.: US 8,173,724 B2
(45) Date of Patent: *May 8, 2012

(54) FIRE RESISTANT MATERIAL AND FORMULATION THEREOF

(75) Inventors: Shou I Chen, Hsinchu (TW); Che I Kao, Hsinchu (TW); Chih-Chien Chen, Hsinchu (TW); Jin-Her Shen, Hsinchu (TW); Wei-Feng Teng, Gongguan Township, Miaoli County (TW); Hsiao-Pin Chiang, Toufen Township, Miaoli County (TW); Kai-Wen Chang, Taichung (TW); Fan-Jeng Tsai, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/196,522

(22) Filed: Aug. 2, 2011

(65) Prior Publication Data

US 2011/0288203 A1 Nov. 24, 2011

Related U.S. Application Data

(60) Division of application No. 11/954,542, filed on Dec. 12, 2007, now Pat. No. 8,013,037, which is a continuation-in-part of application No. 11/642,627, filed on Dec. 21, 2006, which is a continuation-in-part of application No. 11/410,913, filed on Apr. 26, 2006, now abandoned.

(30) Foreign Application Priority Data

Dec. 26, 2005 (TW) ................. 94146503 A
Dec. 4, 2007 (TW) ................. 96146065 A

(51) Int. Cl.
*C08K 9/00* (2006.01)
*C08L 83/00* (2006.01)
*C08F 218/04* (2006.01)
*C08F 26/02* (2006.01)

(52) U.S. Cl. ........ 523/202; 524/436; 524/437; 524/813; 526/301; 528/75; 252/601; 252/609; 252/610

(58) Field of Classification Search .............. 523/200, 523/202, 204–205, 210; 524/400, 432, 436, 524/437, 813; 526/301; 528/75; 427/180, 427/372.2; 428/355 N, 457; 252/601, 609, 252/610; 525/108, 293, 285

See application file for complete search history.

(56) References Cited

U.S. PATENT DOCUMENTS

| 3,536,782 | A | 10/1970 | Toggweiler et al. | |
|---|---|---|---|---|
| 4,211,848 | A | 7/1980 | Blount | |
| 7,662,983 | B2 * | 2/2010 | Chen et al. | 556/179 |
| 2007/0026143 | A1 * | 2/2007 | Campbell | 427/180 |
| 2007/0179235 | A1 * | 8/2007 | Huang et al. | 524/425 |
| 2009/0143603 | A1 | 6/2009 | Chen et al. | |

FOREIGN PATENT DOCUMENTS

TW 200724619 7/2007

OTHER PUBLICATIONS

Chinese language office action dated Nov. 1, 2010.

* cited by examiner

*Primary Examiner* — Vasu Jagannathan
*Assistant Examiner* — Hannah Pak
(74) *Attorney, Agent, or Firm* — Thomas|Kayden

(57) ABSTRACT

The invention provides a fire resistant material and a formulation thereof. The formulation comprises a liquid suspension of a modified inorganic particle and an organic component. The modified inorganic particle comprises an inorganic particle with hydroxyl groups and a surface modifier coupled to the inorganic particle via a urethane linkage, wherein the surface modifier has an ethylenically unsaturated end group. The organic component comprises a monomer, oligomer, prepolymer, polymer, or combinations thereof, capable of reacting with the ethylenically unsaturated end group.

11 Claims, 2 Drawing Sheets

FIRE RESISTANT MATERIAL AND FORMULATION THEREOF

CROSS REFERENCE TO RELATED APPLICATIONS

This application is a Divisional of pending U.S. patent application Ser. No. 11/954,542, filed Dec. 12, 2007, and entitled "Fire Resistant Material and Formulation Thereof", which is a continuation-in-part of application Ser. No. 11/642,627, filed on Dec. 21, 2006, which is a continuation-in-part of application Ser. No. 11/410,913, filed on Apr. 26, 2006, which claims priority to Taiwan Patent application no. 94146503, filed on Dec. 26, 2005. Application Ser. No. 11/954,542 also claims priority of Taiwan Patent Application No. 96146065, filed on Dec. 4, 2007. The foregoing priority applications are incorporated hereby in their entireties.

BACKGROUND

1. Field of the Invention(s)

The invention(s) relates to fire resistant materials and formulations thereof, and in particular to organic/inorganic composites suitable for use as fire resistant materials.

2. Description of the Related Art

Plastic and its composites are widely used in various fields such as sports equipment, indoor decoration materials, building materials, industrial and civil engineering projects, electronic products, automobiles, and so on. However, because plastics are flammable material, fire caused by plastic materials result in enormous personnel casualty and financial losses every year. It is therefore an important research topic to develop an environmentally-friendly fire resistant polymer material or composite that effectively reduces personnel casualty and financial loses due to plastic material fires, while also not causing pollution to the ecology.

Due to growing environmental concerns, there is a clear trend and need to develop halogen-free flame retardant systems. Examples of halogen-free flame retardants include magnesium hydroxide, and aluminum hydroxide. The flame retardant effects of aluminum hydroxide and magnesium hydroxide are based on endothermic decomposition into metal oxide and water, respectively. The plastic is protected from rapid thermal decomposition and the formation of flammable and combustible breakdown products are inhibited. The water vapor that is formed displaces oxygen and functions as protective gas. A heat resistant covering layer including carbonized products and metal oxide is formed on the surface of the plastic, thereof inhibiting combustion, which also reduces smoke density. Metal hydroxide is the most popular halogen-free flame retardant and can be used independently or in combination with other flame retardants to provide fire resistant thermosetting or thermoplastic composites.

Metal hydroxide, for example, aluminum trihydroxide (ATH), includes many —OH groups and usually has moisture adhered to its surface, and therefore has a very high polarity. Therefore, when metal hydroxide is blended with polymer resin, which generally has a low polarity, agglomeration occurs due to poor interfacial compatibility. In addition, because the polymer does not react with metal hydroxide to form a well-structured composite by the formation of chemical bonds, the resulting product easily melts, ignites, or produces flame drippings under exposure to flames. Moreover, the incorporation of metal hydroxide greatly increases the brittleness of the material, thus limiting application fields.

Accordingly, there exists a need for an organic/inorganic composite wherein the inorganic particle has improved polymer compatibilities to provide better flame retardancy and reduced brittleness.

SUMMARY

Embodiments of the present disclosure include fire resistant materials, formulations for providing a fire resistant material, and the like.

In one aspect, embodiments of the present disclosure provide for a formulation for providing a fire resistant material, comprising a liquid suspension comprising a modified inorganic particle and an organic component. The modified inorganic particle comprises an inorganic particle with hydroxyl groups, and a surface modifier coupled to the inorganic particle via a urethane linkage, wherein the surface modifier has an ethylenically unsaturated end group. The organic component is capable of reacting with the ethylenically unsaturated end group, where the organic component is selected from a monomer, an oligomer, a prepolymer, a polymer, or combinations thereof.

In another aspect, embodiments of the present disclosure provide for a fire resistant material prepared by curing the formulations described herein.

A detailed description is given in the following embodiments with reference to the accompanying drawings.

BRIEF DESCRIPTION OF THE DRAWINGS

Embodiments of the present disclosure can be more fully understood by reading the subsequent detailed description and examples with references made to the accompanying drawings, wherein.

DETAILED DESCRIPTION

Embodiments of the present disclosure will employ, unless otherwise indicated, techniques of synthetic organic chemistry, inorganic chemistry, material science, and the like, that are within the skill of the art. Such techniques are explained fully in the literature.

The following examples are put forth so as to provide those of ordinary skill in the art with a complete disclosure and description of how to perform the methods and use the compositions disclosed and claimed herein. Efforts have been made to ensure accuracy with respect to numbers (e.g., amounts, temperature, etc.) but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing and test processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an" and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Discussion

The following description is of the best-contemplated mode of carrying out the embodiments of the present disclosure. This description is made for the purpose of illustrating the general principles of embodiments of the present disclosure and should not be taken in a limiting sense. The scope of embodiments of the present disclosure is best determined by reference to the appended claims.

Embodiments of the fire resistant formulation of the present disclosure include a liquid suspension of inorganic particles. The liquid suspension at least contains a modified inorganic particle and an inorganic component capable of reacting with the modified inorganic particle. The preparation of the modified inorganic particle will be described in reference with FIG. 1.

Figure 1:
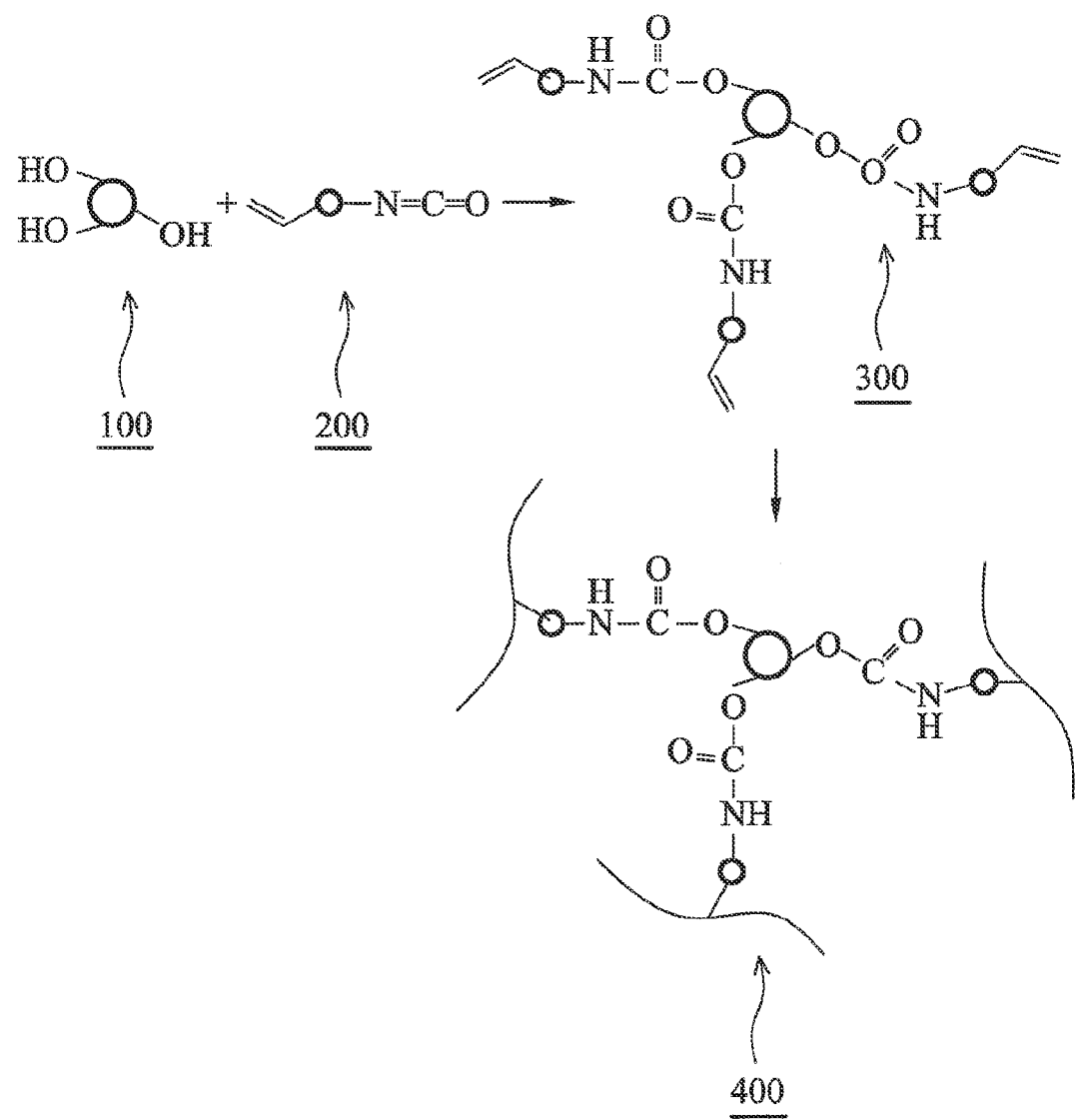
FIG. 1 is a schematic view showing the surface modification of inorganic particles according to an embodiment of the present disclosure.

The modified inorganic particle used herein is an inorganic particle with ethylenically unsaturated groups. Referring to FIG. 1, in an embodiment a surface modifier 200 with an isocyanate group at one end and an ethylenically unsaturated group at the other end is employed for the modification of inorganic particle 100. The surface modifier 200 can be a monomer, an oligomer, or a prepolymer. The surface modifier 200 is coupled to the inorganic particle 10 via a urethane linkage (—NH(CO)O—) by the reaction between the hydroxyl groups of the inorganic particle 100 and the isocyanate groups (—N=C=O) of the surface modifier 200. As shown in the figure, the modified inorganic particle 300 contains ethylenically unsaturated groups, which allows further reaction with the functionality of other reactive monomers, oligomers, prepolymers, or polymers. Thus, the modified inorganic particle 300 can be well dispersed in an organic (polymer) matrix to provide a well-structured, fire resistant composite 400 by the formation of chemical bonds.

For the purposes of the invention, the term "polymer" refers to compounds having number average molecular weights in the range from 1500 to over 1,00,000 Daltons, while "oligomer" refers to compounds having number average molecular weights in the range of from 200 to 1499 Daltons. The term "prepolymer" refers to materials which polymerize in situ to form a polymer and may encompass monomers, oligmers, short chain pseudo-stable polymeric chains which can be normally incorporated into a polymerizing polymer.

The inorganic particles 100 used herein are preferably metal hydroxide, such as, but not limited to, aluminum hydroxide ($Al(OH)_3$) or magnesium hydroxide ($Mg(OH)_2$), but inorganic particles having hydroxyl groups on the surface are suitable for use, for example, oxides such as, but not limited to, $SiO_2$, $TiO_2$, or $ZnO$. The hydroxyl groups may be originally present in the particles or present after surface modification. The inorganic particles may be micro-sized particles with diameters of about 1-50 μm or nano-sized particles with diameters of about 10-500 nm.

Before proceeding with surface modification, it is preferable to dry the inorganic particles in an oven at about 100-130° C. to remove moisture adhered to the particles. The moisture may react with the isocyanate groups of the surface modifier, undesirably reducing the grafting degree of the surface modifier.

The surface modifier 200 used herein is, for example, an isocyanate-bearing acrylate monomer or oligomer, which may be aliphatic or aromatic. The amount of the surface modifier is typically about 2-10 parts by weight, preferably about 3-6 parts by weight, based on 100 parts by weight of the inorganic particle.

The term "aliphatic" includes unsaturated and saturated aliphatic groups including straight-chain alkyl groups, branched-chain alkyl groups, cycloalkyl (alicyclic) groups, alkyl substituted cycloalkyl groups, and cycloalkyl substituted alkyl groups. The term "alkyl" can refer to straight or branched chain hydrocarbon groups, such as methyl, ethyl, n-propyl, i-propyl, n-butyl, i-butyl, t-butyl, pentyl, hexyl, heptyl, octyl, and the like. The term "cycloalkyl" can have from about 3 to about 10 carbon atoms in their ring structure, and alternatively about 5, 6 or 7 carbons in the ring structure. The term "alkyl" is also defined to include halosubstituted (e.g., Cl, Br, F, and I) alkyls and heteroatom substituted alkyls.

The substituted groups for aliphatic groups can include, but are not limited to, a hydroxyl, a halogen (fluorine, chlorine, bromine, and iodine), a carbonyl (such as a carboxyl, an alkoxycarbonyl, a formyl, or an acyl), a thiocarbonyl (such as a thioester, a thioacetate, or a thioformate), an alkoxyl, a phosphoryl, a phosphonate, a phosphinate, an amino, an amido, an amidine, an imine, a cyano, a nitro, an azido, a sulfhydryl, an alkylthio, a sulfate, a sulfonate, a sulfamoyl, a sulfonamido, a sulfonyl, a heterocyclic, an aralkyl, or an aromatic or heteroaromatic moiety. It will be understood by those skilled in the art that the moieties substituted on the hydrocarbon chain may themselves be substituted, if appropriate. For instance, the substituents of a substituted alkyl may include substituted and unsubstituted forms of amino, azido, imino, amido, phosphoryl (including phosphonate and phosphinate), sulfonyl (including sulfate, sulfonamido, sulfamoyl and sulfonate), and silyl groups, as well as ethers, alkylthios, carbonyls (including ketones, aldehydes, carboxylates, and esters), —CN, and the like.

The term "aromatic" can include 5-, 6-, and 7-membered single-ring aromatic groups that may include from zero to four heteroatoms, for example, benzene, pyrrole, furan, thiophene, imidazole, oxazole, thiazole, triazole, pyrazole, pyridine, pyrazine, pyridazine and pyrimidine, and the like. Those aryl groups having heteroatoms in the ring structure may also be referred to as "aryl heterocycles" or "heteroaromatics."

The aromatic ring may be substituted at one or more ring positions with such substituents as described above, for example, halogen, azide, alkyl, aralkyl, alkenyl, alkynyl, cycloalkyl, hydroxyl, alkoxyl, amino, nitro, sulfhydryl, imino, amido, phosphonate, phosphinate, carbonyl, carboxyl, silyl, ether, alkylthio, sulfonyl, sulfonamido, ketone, aldehyde, ester, heterocyclic, aromatic or heteroaromatic moieties, —$CF_3$, —CN, or the like.

The surface modification may be carried out in a reactive solvent. As used herein, the term "reactive solvent" refers to low-viscosity monomers or oligomers capable of reacting with ethylenically unsaturated groups of inorganic particles after surface modification. In the traditional wet modification procedure, additional ingredients are subsequently added to the reaction system of surface modification to obtain the desired fire-resistant material in-situ. However, the presence of solvents and acidic or alkaline catalysts in the reaction system causes difficulty in curing of the fire-resistance material and results in poor control on the appearance and physical properties of the fire-resistance material. The use of reactive solvent obviates the necessity of removing majority of solvent from the reaction system before curing. To avoid interference of the reactive solvent to the modification reaction, it is preferable to use reactive monomers or oligomers without functional groups of —SH, —OH, —COOH, —NH$_2$, and —NHR, where R represents alkyl or aryl groups. Otherwise, these functional groups may react with the isocyanate groups of the modifier, adversely affecting the modification reaction. Suitable reactive solvents include, but are not limited to, styrenes, methyl acrylates, methyl methacrylates, benzyl acrylates, benzyl methacrylates, or combinations thereof.

It is also feasible to carry out the surface modification in a non-reactive solvent. Again, it is preferable to use non-reactive solvents without functional groups of —SH, —OH, —COOH, —NH$_2$, and —NHR (where R represents alkyl or aryl groups) to avoid side reaction with isocyanate. Suitable non-reactive solvents include, but are not limited to, ketones, ethers, esters, aliphatic hydrocarbons, aromatic hydrocarbons, cycloalkanes, or combinations thereof. Illustrative examples of ketone solvents include, but are not limited to, cyclohexanone, methyl ethyl ketone, and methyl t-butyl ketone. Illustrative examples of ether solvents include, but are not limited to, ethyl ether, ethylene glycol dimethyl ether, ethylene glycol ether, ethylene glycol monoethyl ether, tetrahydrofuran (THF), and ethylene glycol monobutyl ether. Illustrative examples of ester solvents include, but are not limited to, propylene glycol methyl ether acetate, 2-ethoxy ethanol acetate, ethyl-3-ethoxypropionate, and isoamyl acetate. Illustrative examples of aliphatic hydrocarbon solvents include, but are not limited to, n-hexane, heptane, and pentane. Illustrative examples of aromatic hydrocarbon solvents include, but are not limited to, benzene, toluene, and xylene. Illustrative examples of cycloalkane solvents include, but are not limited to, cyclohexane, and methyl cyclohexane. The non-reactive solvents are preferably dried to reduce the water content as low as possible before use in the modification reaction.

Any catalysts for accelerating the reaction of isocyanate groups with hydroxyl groups may be employed in the surface modification. Examples of such catalysts include dibutyltin dilaurate (T-12) and stannous octoate (T-9). The reaction of surface modification is typically carried out at a temperature of about 20-80° C., preferably about 40-70° C., more preferably about 45-65° C.

The modified inorganic particles with ethylenically unsaturated groups can undergo a crosslinking reaction with a monomer, an oligomer, or a prepolymer with ethylenically unsaturated groups, such that the modified inorganic particles are uniformly dispersed in an organic resin matrix, providing a three-dimensional organic/inorganic structure. The monomer, oligomer, or prepolymer may further comprise hydroxyl, anhydride, carboxyl, or epoxy groups. That is, the organic component can be any monomer, oligomer, prepolymer, mono-polymer, copolymer, or combinations thereof capable of reacting with the modified inorganic particle. Preferably, the organic component is an organic system for proceeding with a free radical polymerization such as acrylate-based systems, polyolefin-based systems, unsaturated polyester-based systems, vinyl ester-based systems, or polystyrene-based systems. It should be noted, however, the formulation may further include organic systems that are non-reactive to the modified inorganic particle, such as, but not limited to, phenol aldehyde resins, epoxy resins, melamine, and the like.

When surface modification is carried out in a reactive solvent, an organic/inorganic composite can be prepared in-situ by addition of free radical initiators to undergo polymerization of the reactive solvent. If necessary, one or more kinds of additional reactive monomer, oligomer, prepolymer, or polymer may be added to the reaction system to provide various types of fire resistant composites. When the surface modification is carried out in a non-reactive solvent, it is necessary to isolate the modified inorganic particles from the reaction system or remove the majority of the non-reactive solvents before crosslinking with reactive monomer, oligomer, prepolymer, or polymer.

A curing agent may be added during the crosslinking reaction (curing). Examples of curing agents include, but are not limited to, peroxides such as benzoyl peroxide (BPO) and tert-butyl peroxybenzoate (TBPB) as free radical initiators. Further examples of curing agents include, but are not limited to, compounds with —NH, —NH$_2$, or anhydride groups (e.g., dicyandiamide, diethylene triamine, phthalic anhydride, and nadic methyl anhydride). The amount of the curing agent is typically about 0.5-2 parts by weight, based on 100 parts by weight of the organic component. The curing may be carried out at about 20-180° C. for about 0.5-24 hours, depending on the organic component used.

The fire resistant materials of the present disclosure may be fabricated into various forms such as, but not limited to, sheets, plates, or bulk materials by conventional coating or molding techniques. Suitable coating methods include, but are not limited to, brush coating, roller coating, blade coating, spray coating, and the like. Suitable molding methods include, but are not limited to, compression molding, injection molding, extrusion molding, calendar molding, and the like. Furthermore, those skilled in the art will appreciate that other conventional additives can be present in the fire resistant material depending upon the processing needs or end use. Such additives include, but are not limited to, inorganic fillers other than the modified inorganic particle, dispersants, and mold release agents. For example, glass fiber chopped strands or glass sands may be added to enhance mechanical and fire resistant properties, and prevent thermal cracking. Moreover, the fire resistant materials of the present disclosure may be coated on a glass fiber cloth or a glass fiber mat and then press-molded into the desired fire resistant objects of various shapes.

In addition, although the cured organic/inorganic composite can be used as a fire resistant material directly, it can be pulverized into particles for use as a flame retardant. The pulverized particles are modified inorganic particles encapsulated by a polymer surface coating. For example, the pulverized particles can be kneaded with a thermoplastic polymer, plasticizer, and additional inorganic fillers at high temperatures, and then extruded into a fire resistant thermoplastic composite.

The organic/inorganic composites of the present disclosure do not melt, ignite, or produce flame dripping under exposure to flame or ignition sources due to the chemical bonding between the modified inorganic particles and the organic component (compared to the conventional physical bending products). Moreover, the heated area can be carbonized rapidly to form a well-structured char layer which maintains superior structural integrity without peeling or cracking, effectively preventing direct heat transfer to the interior. Experimental study shows that the composites of the present disclosure exhibit improved film-forming properties, toughness, and flame retardancy compared to the counterpart with non-modified inorganic particles.

Without intending to limit it in any manner, the embodiments of the present disclosure will be further illustrated by the following examples.

EXAMPLE 1

10 g of commercial isocyanate-bearing acrylate oligomer, 50 g of styrene, and 0.4 g of dibutyltin dilaurate as catalyst were thoroughly mixed in a 500 ml reactor. 180 g of alumina trihydrate (from Beaming Company, average diameter: 8 μm, previously dried at 130° C. for 2 hours) was slowly added into the reactor and stirred at 50-55° C. for 3 hours. After cooling to room temperature, 20 g of alumina hydroxide dispersion was taken out from the reaction mixture, and added 60 ml styrene, sonicated, centrifuged, and filtered. This procedure was repeated three times. The alumina hydroxide particles obtained was dried in an oven at 60° C. for 2 hours. The infrared spectrum shows characteristic absorption bands of acrylate and —O—C=O at 1500-1750 $cm^{-1}$ and aliphatic hydrogen stretching at 2850-2950 $cm^{-1}$, indicating that the modifier was grafted onto the alumina hydroxide particles.

EXAMPLE 2

10 g of commercial isocyanate-bearing acrylate oligomer, 50 g of styrene, and 0.4 g of dibutyltin dilaurate as catalyst were thoroughly mixed in a 500 ml reactor. 180 g of alumina trihydrate (from Beaming Company, average diameter: 8 μm, previously dried at 130° C. for 2 hours) was slowly added into the reactor and stirred at 50-55° C. for 3 hours. After cooling to room temperature, 10 g of polystyrene powder and 1.0 g of benzoyl peroxide were added to the reactor and mechanically stirred for 30 minutes. Then the mixture was blended in a three-roll mill and charged in a 0.3 mm-thick mold for press molding at 100° C. for 60 minutes. The molded specimen was removed from the mold and cured in an oven at 120° C. for 60 minutes. The cured specimen had a smooth surface with good film-forming properties and met UL94V-0 flame retardancy standards.

EXAMPLE 3

10 g of commercial isocyanate-bearing acrylate oligomer, 50 g of styrene, and 0.3 g of dibutyltin dilaurate as catalyst were thoroughly mixed in a 500 ml reactor. 180 g of alumina trihydrate (from Beaming Company, average diameter: 8 μm, previously dried at 130° C. for 2 hours) was slowly added into the reactor and stirred at 50-55° C. for 3 hours. After cooling to room temperature, 20 g of polystyrene powder, 45 g of unsaturated polyester (Swancor 926 from Swancor Ind. Co., Ltd.), 3.0 g of zinc stearate, and 1.5 g of tert-butyl peroxybenzoate were added to the reactor and mechanically stirred for 30 minutes. Then the mixture was blended in a three-roll mill and charged in a 0.3 mm-thick mold for press molding at 135° C. for 25 minutes. The molded specimen was removed from the mold and cured in an oven at 130° C. for 60 minutes. The cured specimen had a smooth surface with good film-forming properties and met UL94V-0 flame retardancy standards.

EXAMPLE 4

20 g of commercial isocyanate-bearing acrylate oligomer, 80 g of styrene, and 0.25 g of dibutyltin dilaurate as catalyst were thoroughly mixed in a 500 ml reactor. 300 g of alumina trihydrate (from Beaming Company, average diameter: 8 μm, previously dried at 130° C. for 2 hours) was slowly added into the reactor and stirred at 50-55° C. for 3 hours. After cooling to room temperature, 10 g of polystyrene powder, 45 g of unsaturated polyester (Swancor 926 from Swancor Ind. Co., Ltd.), 3.4 g of zinc stearate, 4.5 g of BYK110 dispersant, 0.6 g of benzoyl peroxide, and 1.2 g of tert-butyl peroxybenzoate were added to the reactor and mechanically stirred for 30 minutes. Then the mixture was blended with 66 g of glass fiber chopped strand (⅛ inches, from Taiwan Glass Corp.) and charged in a 0.6 mm-thick mold for press molding at 80° C. for 30 minutes. The molded sample was removed from the mold and cured in an oven at 120° C. for 60 minutes. The cured sample was cut into a 60 mm×60 mm specimen of 0.6 mm thickness. A flame test was conducted on the surface of the specimen with flame temperature of 1100° C., where the backside surface of the specimen was connected to thermocouple of a temperature detector to monitor temperature rise. The backside temperature of the specimen increased to 357° C. after one hour.

EXAMPLE 5

15 g of commercial isocyanate-bearing acrylate oligomer, 75 g of styrene, and 0.45 g of dibutyltin dilaurate as catalyst were thoroughly mixed in a 500 ml reactor. 270 g of alumina trihydrate (from Beaming Company, average diameter: 8 μm, previously dried at 130° C. for 2 hours) was slowly added into the reactor and stirred at 50-55° C. for 3 hours. After cooling to room temperature, 10 g of polystyrene powder, 30 g of maleic anhydride, 6.3 g of zinc stearate, 2.7 g of BYK110 dispersant, and 1.9 g of tert-butyl peroxybenzoate were added to the reactor and mechanically stirred for 30 minutes. Then the mixture was blended with 98 g of glass fiber chopped strand (⅛ inches, from Taiwan Glass Corp.) and charged in a 0.6 mm-thick mold for press molding at 140° C. for 30 minutes. The molded sample was removed from the mold and cured in an oven at 130° C. for 60 minutes. The cured sample was cut into a 60 mm×60 mm specimen of 0.6 mm thickness. A flame test was conducted on the surface of the specimen with flame temperature of 1100° C., where the backside surface of the specimen was connected to thermocouple of a temperature detector to monitor temperature rise. The backside temperature of the specimen increased to 341° C. after one hour.

EXAMPLE 6

10 g of commercial isocyanate-bearing acrylate oligomer, 50 g of styrene, and 0.3 g of dibutyltin dilaurate as catalyst were thoroughly mixed in a 500 ml reactor. 180 g of alumina trihydrate (from Beaming Company, average diameter: 8 μm, previously dried at 130° C. for 2 hours) was slowly added into the reactor and stirred at 50-55° C. for 3 hours. After cooling to room temperature, 10 g of polystyrene powder, 10 g of maleic anhydride, 10 g of melamine, 4 g of zinc stearate, 2 g of BYK110 dispersant, and 0.9 g of tert-butyl peroxybenzoate were added to the reactor and mechanically stirred for 30 minutes. Then the mixture was blended with 65 g of glass fiber chopped strand (⅛ inches, from Taiwan Glass Corp.) and charged in a 0.6 mm-thick mold for press molding at 140° C. for 30 minutes. The molded sample was removed from the mold and cured in an oven at 130° C. for 60 minutes. The cured sample was cut into a 60 mm×60 mm specimen of 0.6 mm thickness. A flame test was conducted on the surface of the specimen with flame temperature of 1100° C., where the backside surface of the specimen was connected to thermocouple of a temperature detector to monitor temperature rise. The backside temperature of the specimen increased to 261.1° C. after one hour.

EXAMPLE 7

20 g of commercial isocyanate-bearing acrylate oligomer, 100 g of styrene, and 0.8 g of dibutyltin dilaurate as catalyst were thoroughly mixed in a 500 ml reactor. 360 g of alumina trihydrate (from Beaming Company, average diameter: 8 µm, previously dried at 130° C. for 2 hours) was slowly added into the reactor and stirred at 50-55° C. for 3 hours. After cooling to room temperature, 10 g of polystyrene powder, 5 g of zinc stearate, 2.6 g of BYK110 dispersant, and 2.0 g of benzoyl peroxide were added to the reactor and mechanically stirred for 30 minutes. Then the mixture was blended with 160 g of glass fiber chopped strand (⅛ inches, from Taiwan Glass Corp.) and a portion of the resulting blend was applied to a 0.6 mm-thick mold to form a coating of about 0.2-0.25 mm thickness. A glass fiber cloth of 0.15 mm thickness (from Taiwan Glass Corp.) was placed on the coating, and then another portion of the blend was applied to the glass fiber cloth to fill the mold. Thereafter, press molding was carried out at 100° C. for 60 minutes. The molded sample was removed from the mold and cured in an oven at 120° C. for 60 minutes. The cured sample was cut into a 60 mm×60 mm specimen of 0.6 mm thickness. A flame test was conducted on the surface of the specimen with flame temperature of 1100° C., where the backside surface of the specimen was connected to thermocouple of a temperature detector to monitor temperature rise. The backside temperature of the specimen increased to 254° C. after one hour.

EXAMPLE 8

20 g of commercial isocyanate-bearing acrylate oligomer, 80 g of styrene, and 0.25 g of dibutyltin dilaurate as catalyst were thoroughly mixed in a 500 ml reactor. 300 g of alumina trihydrate (from Beaming Company, average diameter: 8 µm, previously dried at 130° C. for 2 hours) was slowly added into the reactor and stirred at 50-55° C. for 3 hours. After cooling to room temperature, 10 g of polystyrene powder, 30 g of unsaturated polyester (Swancor 926 from Swancor Ind. Co., Ltd.), 3.4 g of zinc stearate, 4.5 g of BYK110 dispersant, 0.6 g of benzoyl peroxide, and 1.2 g of tert-butyl peroxybenzoate were added to the reactor and mechanically stirred for 30 minutes. Then the mixture was blended with 66 g of glass fiber chopped strand (⅛ inches, from Taiwan Glass Corp.) and a portion of the resulting blend was applied to a 0.6 mm-thick mold to form a coating of about 0.2-0.3 mm thickness. A glass fiber cloth of 0.15 mm thickness (from Taiwan Glass Corp.) was placed on the coating, and then another portion of the blend was applied to the glass fiber cloth to fill the mold. Thereafter, press molding was carried out at 80° C. for 30 minutes, and then 120° C. for 30 minutes. The molded sample was removed from the mold and cured in an oven at 120° C. for 60 minutes. The cured sample was cut into a 60 mm×60 mm specimen of 0.6 mm thickness. A flame test was conducted on the surface of the specimen with flame temperature of 1100° C., where the backside surface of the specimen was connected to thermocouple of a temperature detector to monitor temperature rise. The backside temperature of the specimen increased to 248° C. after one hour.

EXAMPLE 9

15 g of commercial isocyanate-bearing acrylate oligomer, 75 g of styrene, and 0.45 g of dibutyltin dilaurate as catalyst were thoroughly mixed in a 500 ml reactor. 270 g of alumina trihydrate (from Beaming Company, average diameter: 8 µm, previously dried at 130° C. for 2 hours) was slowly added into the reactor and stirred at 50-55° C. for 3 hours. After cooling to room temperature, 20 g of polystyrene powder, 20 g of maleic anhydride, 6.3 g of zinc stearate, 2.7 g of BYK110 dispersant, and 1.6 g of tert-butyl peroxybenzoate were added to the reactor and mechanically stirred for 30 minutes. Then the mixture was blended with 126 g of glass fiber chopped strand (⅛ inches, from Taiwan Glass Corp.) and a portion of the resulting blend was applied to a 0.6 mm-thick mold to form a coating of about 0.2-0.25 mm thickness. A glass fiber cloth of 0.15 mm thickness (from Taiwan Glass Corp.) was placed on the coating, and then another portion of the blend was applied to the glass fiber cloth to fill the mold. Thereafter, press molding was carried out at 140° C. for 30 minutes. The molded sample was removed from the mold and cured in an oven at 130° C. for 60 minutes. The cured sample was cut into a 60 mm×60 mm specimen of 0.6 mm thickness. A flame test was conducted on the surface of the specimen with flame temperature of 1100° C., where the backside surface of the specimen was connected to thermocouple of a temperature detector to monitor temperature rise. The backside temperature of the specimen increased to 257° C. after one hour.

EXAMPLE 10

20 g of commercial isocyanate-bearing acrylate oligomer, 80 g of styrene, and 0.4 g of dibutyltin dilaurate as catalyst were thoroughly mixed in a 500 ml reactor. 270 g of alumina trihydrate (from Beaming Company, average diameter: 8 µm, previously dried at 130° C. for 2 hours) was slowly added into the reactor and stirred at 50-55° C. for 3 hours. After cooling to room temperature, 10 g of polystyrene powder, 30 g of vinyl ester resin (vinyl ester 977 from Swancor Ind. Co., Ltd.), 6.75 g of zinc stearate, 4.5 g of BYK110 dispersant, 0.6 g of benzoyl peroxide and 1.2 g of tert-butyl peroxybenzoate were added to the reactor and mechanically stirred for 30 minutes. Then the mixture was blended with 168 g of glass fiber chopped strand (⅛ inches, from Taiwan Glass Corp.) and a portion of the resulting blend was applied to a 0.6 mm-thick mold to form a coating of about 0.2-0.25 mm thickness. A glass fiber cloth of 0.15 mm thickness (from Taiwan Glass Corp.) was placed on the coating, and then another portion of the blend was applied to the glass fiber cloth to fill the mold. Thereafter, press molding was carried out at 80° C. for 30 minutes, and then 120° C. for 30 minutes. The molded sample was removed from the mold and cured in an oven at 120° C. for 60 minutes. The cured sample was cut into a 60 mm×60 mm specimen of 0.6 mm thickness. A flame test was conducted on the surface of the specimen with flame temperature of 1100° C., where the backside surface of the specimen was connected to thermocouple of a temperature detector to monitor temperature rise. The backside temperature of the specimen increased to 276° C. after one hour.

EXAMPLE 11

10 g of commercial isocyanate-bearing acrylate oligomer, 50 g of styrene, and 0.3 g of dibutyltin dilaurate as catalyst were thoroughly mixed in a 500 ml reactor. 180 g of alumina trihydrate (from Beaming Company, average diameter: 8 µm, previously dried at 130° C. for 2 hours) was slowly added into the reactor and stirred at 50-55° C. for 3 hours. After cooling to room temperature, 10 g of polystyrene powder, 10 g of maleic anhydride, 4 g of zinc stearate, 2 g of BYK110 dispersant, and 0.9 g of tert-butyl peroxybenzoate were added to the reactor and mechanically stirred for 30 minutes. Then the mixture was blended with 65 g of glass fiber chopped strand (⅛ inches, from Taiwan Glass Corp.) and a portion of the resulting blend was applied to a 0.6 mm-thick mold to form a coating of about 0.2-0.25 mm thickness. A glass fiber cloth of 0.15 mm thickness (from Taiwan Glass Corp.) was placed on the coating, and then another portion of the blend was applied to the glass fiber cloth to fill the mold. Thereafter, press molding was carried out at 140° C. for 30 minutes. The molded sample was removed from the mold and cured in an oven at 130° C. for 60 minutes. The cured sample was cut into a 60 mm×60 mm specimen of 0.6 mm thickness. A flame test was conducted on the surface of the specimen with flame temperature of 1100° C., where the backside surface of the specimen was connected to thermocouple of a temperature detector to monitor temperature rise. The backside temperature of the specimen increased to 253.1° C. after one hour.

EXAMPLE 12

15 g of commercial isocyanate-bearing acrylate oligomer, 75 g of styrene, and 0.45 g of dibutyltin dilaurate as catalyst were thoroughly mixed in a 500 ml reactor. 270 g of alumina trihydrate (from Beaming Company, average diameter: 8 μm, previously dried at 130° C. for 2 hours) was slowly added into the reactor and stirred at 50-55° C. for 3 hours. After cooling to room temperature, 20 g of polystyrene powder, 25 g of epoxy resin (Epoxy 128 from Nan Ya Plastics Corp.), 6.3 g of zinc stearate, 2.7 g of BYK110 dispersant, 1.1 g of tert-butyl peroxybenzoate, 1.4 g of dicyandiamide, and 0.8 g of dichloro phenyl dimethyl urea (DCMU) were added to the reactor and mechanically stirred for 30 minutes. Then the mixture was blended with 146 g of glass fiber chopped strand (⅛ inches, from Taiwan Glass Corp.) and a portion of the resulting blend was applied to a 0.6 mm-thick mold to form a coating of about 0.2-0.25 mm thickness. A glass fiber cloth of 0.15 mm thickness (from Taiwan Glass Corp.) was placed on the coating, and then another portion of the blend was applied to the glass fiber cloth to fill the mold. Thereafter, press molding was carried out at 150° C. for 30 minutes. The molded sample was removed from the mold and cured in an oven at 130° C. for 60 minutes. The cured sample was cut into a 60 mm×60 mm specimen of 0.6 mm thickness. A flame test was conducted on the surface of the specimen with flame temperature of 1100° C., where the backside surface of the specimen was connected to thermocouple of a temperature detector to monitor temperature rise. The backside temperature of the specimen increased to 255° C. after 15 minutes, and increased to 271.8° C. after 25 minutes.

COMPARATIVE EXAMPLE 1

75 g of styrene and 2.7 g of BYK110 dispersant were thoroughly mixed in a 500 ml plastic jar. 270 g of alumina trihydrate (from Beaming Company, average diameter: 8 μm, previously dried at 130° C. for 2 hours) was slowly added into the reactor. Following this, 20 g of polystyrene powder, 25 g of epoxy resin (Epoxy 128 from Nan Ya Plastics Corp.), 6.3 g of zinc stearate, 1.1 g of tert-butyl peroxybenzoate, 1.4 g of dicyandiamide, and 0.8 g of dichloro phenyl dimethyl urea (DCMU) were added to the reactor and mechanically stirred for 30 minutes. Then the mixture was blended with 146 g of glass fiber chopped strand (⅛ inches, from Taiwan Glass Corp.) and a portion of the resulting blend was applied to a 0.6 mm-thick mold to form a coating of about 0.2-0.25 mm thickness. A glass fiber cloth of 0.15 mm thickness (from Taiwan Glass Corp.) was placed on the coating, and then another portion of the blend was applied to the glass fiber cloth to fill the mold. Thereafter, press molding was carried out at 150° C. for 30 minutes. The molded sample was removed from the mold and cured in an oven at 130° C. for 60 minutes. The cured sample was cut into a 60 mm×60 mm specimen of 0.6 mm thickness. A flame test was conducted on the surface of the specimen with flame temperature of 1100° C., where the backside surface of the specimen was connected to thermocouple of a temperature detector to monitor temperature rise. The backside temperature of the specimen increased to 374.2° C. after 15 minutes, and increased to 322.8° C. after 25 minutes.

Figure 2:
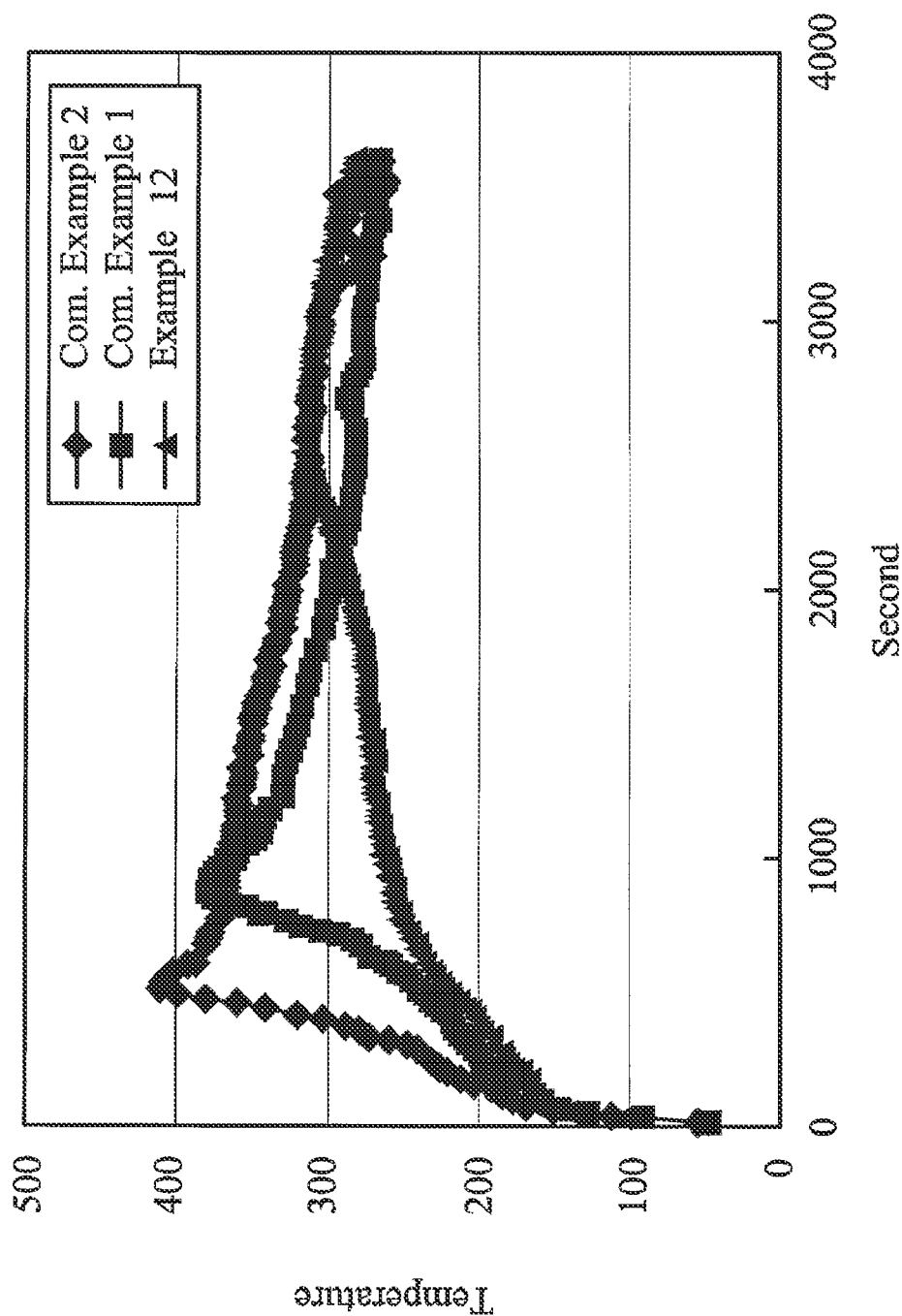
FIG. 2 is a diagram showing the backside temperature of test specimens as a function of heating time, wherein the fire resistant materials of Example 12 and Comparative Examples 1-2 are compared.

The flame test results of Comparative Example 1 and Example 12 are compared in FIG. 2. As shown in the figure, the temperature increase curve is smoother for Example 12, indicating improved flame retardancy over Comparative Example 1, in which the inorganic particle was not modified.

COMPARATIVE EXAMPLE 2

75 g of styrene, 15 g of methacryloxy propyltrimethoxysilane (from Shin Etsu Chemical Corp.) and 2.7 g of BYK110 dispersant were thoroughly mixed in a 500 ml reactor. 270 g of alumina trihydrate (from Beaming Company, average diameter: 8 μm, previously dried at 130° C. for 2 hours) was slowly added into the reactor and stirred at 50-55° C. for 3 hours. After cooling to room temperature, 20 g of polystyrene powder, 25 g of epoxy resin (Epoxy 128 from Nan Ya Plastics Corp.), 6.3 g of zinc stearate, 1.1 g of tert-butyl peroxybenzoate, 1.4 g of dicyandiamide, and 0.8 g of dichloro phenyl dimethyl urea (DCMU) were added to the reactor and mechanically stirred for 30 minutes. Then the mixture was blended with 146 g of glass fiber chopped strand (⅛ inches, from Taiwan Glass Corp.) and a portion of the resulting blend was applied to a 0.6 mm-thick mold to form a coating of about 0.2-0.25 mm thickness. A glass fiber cloth of 0.15 mm thickness (from Taiwan Glass Corp.) was placed on the coating, and then another portion of the blend was applied to the glass fiber cloth to fill the mold. Thereafter, press molding was carried out at 150° C. for 30 minutes. The molded sample was removed from the mold and cured in an oven at 130° C. for 60 minutes. The cured sample was cut into a 60 mm×60 mm specimen of 0.6 mm thickness. A flame test was conducted on the surface of the specimen with flame temperature of 1100° C., where the backside surface of the specimen was connected to thermocouple of a temperature detector to monitor temperature rise. The backside temperature of the specimen increased to 366.3° C. after 15 minutes, and increased to 350.7° C. after 25 minutes.

The flame test results of Comparative Example 2 and Example 12 are also compared in FIG. 2. As shown in the figure, the temperature increase curve is smoother for Example 12, indicating improved flame retardancy over Comparative Example 2, in which the inorganic particle was modified by an acrylate-containing, silane coupling agent.

PREPARATIVE EXAMPLE 1

160.0 g of polypropylene glycol (PPG-1000, Mw=1000) and 9.4 g of 1,6-hexanediol were charged in a glass container, and vacuum dried at 105° C. for at least four hours to reduce the water content to below 400 ppm.

100.8 g of 1.6 hexamethylene diisocyanate was charged in a four-neck reactor under nitrogen atmosphere and preheated to 120° C. The dried polypropylene glycol and 1,6-hexanediol were slowly added into the reactor. After the addition, the reaction mixture was stirred at 120-130° C. for 5 hours and then the remaining content of free isocyanate (—NCO) was monitored. When the remaining content of isocyanate was decreased to about 11.5%, the first reaction stage was stopped by cooling.

After cooling to 50° C., the second reaction stage began by adding 1.5 g of dibutyltin dilaurate to the above mixture. 20.8 g of 2-hydroxypropyl acrylate (2-HPA) was slowly added at 50° C., and after the addition, the resulting mixture was stirred at 50° C. for 3 hours and the remaining content of isocyanate was monitored. The second reaction stage was stopped when the remaining content of isocyanate was decreased to about 8.5%, thus providing a high-viscosity, isocyanate-bearing acrylate oligomer, which was solid at room temperature, and the remaining content of isocyanate thereof was measured to be 6.5%.

PREPARATIVE EXAMPLE 2

200.0 g of polypropylene glycol (PPG-1000, Mw=1000) and 4.1 g of 1,6-hexanediol were charged in a glass container, and vacuum dried at 105° C. for at least four hours to reduce the water content to below 400 ppm.

126.0 g of 1.6 hexamethylene diisocyanate was charged in a four-neck reactor under nitrogen atmosphere and preheated to 120° C. The dried polypropylene glycol and 1,6-hexanediol were slowly added into the reactor within 60 minutes. After the addition, the reaction mixture was stirred at 120-130° C. for 6 hours and then the remaining content of free isocyanate (—NCO) was monitored. When the remaining content of isocyanate was decreased to about 13.1%, the first reaction stage was stopped by cooling.

After cooling to 50° C., the second reaction stage began by adding 1.8 g of dibutyltin dilaurate to the above mixture. At 50° C., 26.0 g of 2-hydroxypropyl acrylate (2-HPA) was added stepwise within 30 minutes. After the addition, the resulting mixture was stirred at 50° C. for 5 hours and the remaining content of isocyanate was monitored. The second reaction stage was stopped when the remaining content of isocyanate was decreased to about 9.7%, thus providing an isocyanate-bearing acrylate oligomer, which was low-viscosity liquid (1425 cps at 25° C.), and the remaining content of isocyanate thereof was measured to be 8.3%.

PREPARATIVE EXAMPLE 3

200.0 g of polypropylene glycol (PPG-1000, Mw=1000) and 4.1 g of 1,6-hexanediol were charged in a glass container, and vacuum dried at 105° C. for at least four hours to reduce the water content to below 400 ppm.

132.2 g of 2.4/2.6 toluene diisocyanate (TDI) was charged in a four-neck reactor under nitrogen atmosphere and preheated to 70° C. The dried polypropylene glycol and 1,6-hexanediol were slowly added into the reactor within 60 minutes. After the addition, the reaction mixture was stirred at 70-75° C. for 3 hours and then the remaining content of free isocyanate (—NCO) was monitored. When the remaining content of isocyanate was decreased to about 13.1%, the first reaction stage was stopped by cooling.

After cooling to 40° C., the second reaction stage began by adding 0.3 g of dibutyltin dilaurate to the above mixture. At 40° C., 26.0 g of 2-hydroxypropyl acrylate (2-HPA) was added stepwise within 30 minutes. After the addition, the resulting mixture was stirred at 50° C. for 5 hours and the remaining content of isocyanate was monitored. The second reaction stage was stopped when the remaining content of isocyanate was decreased to about 9.8%, thus providing an isocyanate-bearing acrylate oligomer, which was colorless liquid (viscosity: 15,000 cps at 25° C.), and the remaining content of isocyanate thereof was measured to be 9.1%.

COMPARATIVE EXAMPLE 3

40 g of styrene was placed in a 200 ml plastic jar, and 75 g of non-modified alumina trihydrate (from Beaming Company, average diameter: 8 μm) was slowly added into the plastic jar and thoroughly mixed. Thereafter, 10 g of polystyrene powder and 0.75 g of benzoyl peroxide were added, and mechanically stirred for 30 minutes. 41.7 g of glass fiber chopped strand (⅛ inches, from Taiwan Glass Corp.) was blended into the mixture and charged in a 0.3 mm-thick mold for press molding at 120° C. for 60 minutes. The molded sample was removed from the mold and cured in an oven at 130° C. for 60 minutes. The cured sample was cut into five 12.7 mm×127 mm specimens. The UL94 flammability test was carried out on the specimens. The specimens exhibited dripping behavior, failing to meet UL94 flame retardancy standards.

EXAMPLE 13

40 g of styrene was placed in a 200 ml plastic jar, and 75 g of alumina trihydrate modified by the isocyanate-bearing acrylate oligomer of Preparative Example 1 was slowly added into the plastic jar and thoroughly mixed. Thereafter, 10 g of polystyrene powder and 0.75 g of benzoyl peroxide were added, and mechanically stirred for 30 minutes. 41.7 g of glass fiber chopped strand (⅛ inches, from Taiwan Glass Corp.) was blended into the mixture and charged in a 0.3 mm-thick mold for press molding at 120° C. for 60 minutes. The molded sample was removed from the mold and cured in an oven at 130° C. for 60 minutes. The cured sample was cut into five 12.7 mm×127 mm specimens. The UL94 flammability test was carried out on the specimens, which met UL94-V0 flame retardancy standards.

EXAMPLE 14

3 g of the isocyanate-bearing acrylate oligomer of Preparative Example 1, 40 g of styrene, and 0.15 g of dibutyltin dilaurate as catalyst were thoroughly mixed in a 500 ml reactor, followed by slow addition of 75 g of alumina trihydrate (from Beaming Company, average diameter: 8 μm, previously dried at 130° C. for 2 hours). The mixture was stirred at 50-55° C. for 3 hours. After cooling to room temperature, 10 g of polystyrene powder and 0.75 g of tert-butyl peroxybenzoate were added and mechanically stirred for 30 minutes. 42.7 g of glass fiber chopped strand (⅛ inches, from Taiwan Glass Corp.) was blended into the mixture and charged in a 0.3 mm-thick mold for press molding at 120° C. for 60 minutes. The molded sample was removed from the mold and cured in an oven at 130° C. for 60 minutes. The cured sample was cut into five 12.7 mm×127 mm specimens. The UL94 flammability test was carried out on the specimens, which met UL94-V0 flame retardancy standards.

COMPARATIVE EXAMPLE 4

50 g of vinyl ester resin and 0.3 g of cobalt salt were mixed in a 200 ml plastic jar, and 65 g of non-modified alumina trihydrate was slowly added into the plastic jar. After stirring for 30 minutes, 0.75 g of methyl ethyl ketone peroxide (MEKPO) was added. Then 38.3 g of glass fiber chopped strand (⅛ inches, from Taiwan Glass Corp.) was blended into the mixture and charged in a 0.3 mm-thick mold, which was kept at room temperature for 6 hours. The molded sample was removed from the mold and cured in an oven at 130° C. for 60 minutes. The cured sample was cut into five 12.7 mm×127 mm specimens. The UL94 flammability test was carried out on the specimens, which failed to meet UL94 flame retardancy standards.

EXAMPLE 15

50 g of vinyl ester resin and 0.3 g of cobalt salt were mixed in a 200 ml plastic jar, and 65 g of alumina trihydrate was slowly added into the plastic jar. After stirring for 30 minutes, 2 g of the isocyanate-bearing acrylate oligomer of Preparative Example 2 was added and thoroughly mixed, followed by addition of 0.75 g of methyl ethyl ketone peroxide (MEKPO). Then 39.3 g of glass fiber chopped strand (⅛ inches, from Taiwan Glass Corp.) was blended into the mixture and charged in a 0.3 mm-thick mold, which was kept at room temperature for 6 hours. The molded sample was removed from the mold and cured in an oven at 130° C. for 60 minutes. The cured sample was cut into five 12.7 mm×127 mm specimens. The UL94 flammability test was carried out on the specimens, which met UL94-V0 flame retardancy standards.

EXAMPLE 16

50 g of vinyl ester resin and 0.3 g of cobalt salt were mixed in a 200 ml plastic jar, and 65 g of alumina trihydrate modified by the isocyanate-bearing acrylate oligomer of Preparative Example 2 was slowly added into the plastic jar. After stirring for 30 minutes, 0.75 g of methyl ethyl ketone peroxide (MEKPO) was added. Then 38.3 g of glass fiber chopped strand (⅛ inches, from Taiwan Glass Corp.) was blended into the mixture and charged in a 0.3 mm-thick mold, which was kept at room temperature for 6 hours. The molded sample was removed from the mold and cured in an oven at 130° C. for 60 minutes. The cured sample was cut into five 12.7 mm×127 mm specimens. The UL94 flammability test was carried out on the specimens, which met UL94-V0 flame retardancy standards.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include ±1%, ±2%, ±3%, ±4%, ±5%, ±6%, ±7%, ±8%, ±9%, or ±10%, or more of the numerical value(s) being modified. In addition, the phrase "about 'x' to 'y'" includes "about 'x' to about 'y'".

While embodiments of the present disclosure have been described by way of examples and in terms of preferred embodiment, it is to be understood that embodiments of the present disclosure are not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A fire resistant material, comprising:
an organic/inorganic composite prepared by curing a formulation comprising a liquid suspension comprising:
a modified inorganic particle, comprising an inorganic particle with hydroxyl groups, and a surface modifier coupled to the inorganic particle via a urethane linkage, wherein the surface modifier is selected from a monomer, an oligomer, or a prepolymer, that contains an isocyanate at one end and an ethylenically unsaturated group at the other end; and
an organic component capable of reacting with the ethylenically unsaturated end group, wherein the organic component is selected from a monomer, an oligomer, a prepolymer, a polymer, or combinations thereof.

2. The fire resistant material as claimed in claim 1, wherein the inorganic particle is selected from a metal hydroxide or an oxide.

3. The fire resistant material as claimed in claim 2, wherein the metal hydroxide is selected from $Al(OH)_3$ or $Mg(OH)_2$.

4. The fire resistant material as claimed in claim 3, wherein the oxide is selected from $SiO_2$, $TiO_2$, or ZnO.

5. The fire resistant material as claimed in claim 1, wherein the organic component at least contains an ethylenically unsaturated group.

6. The fire resistant material as claimed in claim 5, wherein the organic component includes a group selected from a hydroxyl, an anhydride, a carboxyl, or an epoxy group.

7. The fire resistant material as claimed in claim 1, further comprising one or more of an inorganic filler other than the modified inorganic particle, a dispersant, a mold release agent, a curing agent, or combinations thereof.

8. The fire resistant material as claimed in claim 7, wherein the curing agent comprising a free radical initiator.

9. The fire resistant material as claimed in claim 1, further comprising a component selected from a glass fiber cloth or a glass fiber mat.

10. The fire resistant material as claimed in claim 1, wherein the fire resistant material is formed into a structure selected from a sheet, a plate, or a bulk material.

11. The fire resistant material as claimed in claim 1, wherein the fire resistant material meets UL94V-0 standard.

* * * * *